(12) United States Patent
Liljestrand et al.

(10) Patent No.: US 9,683,477 B2
(45) Date of Patent: Jun. 20, 2017

(54) METHOD AND DEVICE PERTAINING TO LIMITING THE TEMPERATURE OF A DOSING UNIT IN A SCR SYSTEM

(75) Inventors: Andreas Liljestrand, Södertälje (SE); Per Bremberg, Södertälje (SE)

(73) Assignee: SCANIA CV AB (SE)

( * ) Notice: Subject to any disclaimer, the term of this patent is extended or adjusted under 35 U.S.C. 154(b) by 399 days.

(21) Appl. No.: 13/704,733

(22) PCT Filed: Jun. 20, 2011

(86) PCT No.: PCT/SE2011/050798
§ 371 (c)(1),
(2), (4) Date: Dec. 17, 2012

(87) PCT Pub. No.: WO2011/162700
PCT Pub. Date: Dec. 29, 2011

(65) Prior Publication Data
US 2013/0091829 A1    Apr. 18, 2013

(30) Foreign Application Priority Data
Jun. 21, 2010 (SE) ...................................... 1050648

(51) Int. Cl.
*F01N 3/00* (2006.01)
*F01N 11/00* (2006.01)
(Continued)

(52) U.S. Cl.
CPC ............ *F01N 11/002* (2013.01); *F01N 3/208* (2013.01); *F01N 3/2066* (2013.01);
(Continued)

(58) Field of Classification Search
CPC ...... F01N 11/002; F01N 3/2066; F01N 3/208; F01N 2610/02; F01N 2900/0408;
(Continued)

(56) References Cited

U.S. PATENT DOCUMENTS 4,233,811 A  *  11/1980  Masaki ........................... 60/274
5,183,128 A  *   2/1993  Ito ........................... B60K 28/16
                                                                180/197
(Continued)

FOREIGN PATENT DOCUMENTS

WO  WO 2009050948 A1  *  4/2009
WO  WO 2010/003424 A1     1/2010

OTHER PUBLICATIONS

International Search Report dated Oct. 11, 2011 issued in corresponding international patent application No. PCT/SE2011/050798.

*Primary Examiner* — Phutthiwat Wongwian
*Assistant Examiner* — Matthew T Largi
(74) *Attorney, Agent, or Firm* — Ostrolenk Faber LLP (57) ABSTRACT

A method pertaining to an SCR system for cleaning of exhaust gases from an engine (150). A dosing unit (250) is in thermal contact with the engine's exhaust system and supplies a reducing agent to an exhaust duct (240) of the exhaust system. Determining (s340) whether there is an undesired temperature level of the dosing unit (250). If yes, limit (s360) the temperature of the exhaust duct (240) by controlling operation of the engine. Also, a computer program product containing program code (P) for implementing the method. Also a device and a motor vehicle (100) which is equipped with the device are disclosed.

18 Claims, 3 Drawing Sheets (51) Int. Cl.
*F01N 3/20* (2006.01)
*F02D 41/02* (2006.01)
*F02D 41/14* (2006.01)
*F02D 41/00* (2006.01)
*F02D 41/40* (2006.01)
*F02P 5/15* (2006.01)

(52) U.S. Cl.
CPC ..... *F02D 41/0235* (2013.01); *F02D 41/1446* (2013.01); *F01N 2610/02* (2013.01); *F01N 2610/1453* (2013.01); *F01N 2900/0408* (2013.01); *F01N 2900/1811* (2013.01); *F02D 41/008* (2013.01); *F02D 41/0052* (2013.01); *F02D 41/40* (2013.01); *F02D 2041/0265* (2013.01); *F02D 2200/0804* (2013.01); *F02D 2250/26* (2013.01); *F02P 5/1502* (2013.01); *Y02T 10/24* (2013.01)

(58) Field of Classification Search
CPC ........ F01N 2900/1811; F02D 41/0235; F02D 41/1446; F02D 2041/0265; F02D 2200/0804; F02D 2250/26; F02D 41/0052; F02D 41/008; F02D 41/40; F02P 5/1502; Y02T 10/24
USPC .................................................. 60/274, 285
See application file for complete search history.

(56) References Cited

U.S. PATENT DOCUMENTS

| | | | |
|---|---|---|---|
| 5,201,173 A * | 4/1993 | Fujimoto et al. ................ 60/277 |
| 7,246,595 B1 * | 7/2007 | Hoare ................... F01N 13/011 |
| | | | 123/294 |
| 2005/0060989 A1 * | 3/2005 | Kawashima ........... F01N 3/023 |
| | | | 60/295 |
| 2007/0256666 A1 * | 11/2007 | Cunningham et al. ....... 123/445 |
| 2008/0295514 A1 | 12/2008 | Ono |
| 2009/0205316 A1 * | 8/2009 | Dougnier et al. ............. 60/274 |
| 2009/0288395 A1 * | 11/2009 | Haeberer et al. ............. 60/286 |
| 2010/0057325 A1 * | 3/2010 | Livshiz et al. ................ 701/102 |
| 2010/0242439 A1 * | 9/2010 | Domon et al. ................ 60/274 |

* cited by examiner

METHOD AND DEVICE PERTAINING TO LIMITING THE TEMPERATURE OF A DOSING UNIT IN A SCR SYSTEM

CROSS-REFERENCE TO RELATED APPLICATIONS

The present application is a 35 U.S.C. §§371 national phase conversion of PCT/SE2011/050798, filed Jun. 20, 2011, which claims priority of Swedish Application No. 1050648-3, filed Jun. 21, 2010, the contents of which are incorporated by reference herein. The PCT International Application was published in the English language.

TECHNICAL FIELD

The present invention relates to a method pertaining to an SCR system for cleaning of exhaust gases from an engine, comprising a dosing unit situated in thermal contact with the engine's exhaust system and intended to supply a reducing agent to an exhaust duct of the exhaust system. The invention relates also to a computer programme product which contains programme code for a computer for implementing a method according to the invention. The invention relates also to a device of an SCR system for exhaust cleaning for an engine and to a motor vehicle which is equipped with the device.

BACKGROUND

Vehicles today use, for example, urea as reductant in SCR (selective catalytic reduction) systems which comprise an SCR catalyst, in which catalyst said reductant and NOx gas can react and be converted to nitrogen gas and water. Various types of reductants may be used in SCR systems. AdBlue is an example of a commonly used reductant.

One type of SCR system comprises a container for a reductant. The SCR system may also have a pump adapted to drawing said reductant from the container via a suction hose and to supplying it via a pressure hose to a dosing unit situated adjacent to an exhaust system of the vehicle, e.g. adjacent to an exhaust pipe of the exhaust system. The dosing unit is adapted to injecting a necessary amount of reductant into the exhaust pipe upstream of the SCR catalyst according to operating routines stored in a control unit of the vehicle. To make it easier to regulate the pressure when no or only small amounts are being dosed, the system comprises also a return hose which runs back from a pressure side of the system to the container. This configuration makes it possible to cool the dosing unit by means of the reductant which, during cooling, flows from the container via the pump and the dosing unit and back to the container. The dosing unit is thus provided with active cooling.

In certain operating situations, the dosing unit cannot be cooled adequately. One such case may be where the reductant of the SCR system is wholly or partly frozen, with consequent adverse effects on a cooling flow of the dosing unit. Another such case may be where the reductant in the SCR system has been used up or the pump does not function as intended. A further such case may be where there is leakage of the SCR system. Such leakage might for example occur at a fastening between a hose and the pump. Alternatively, said leakage might occur on a hose of the SCR system.

The above operating situations involve risk of the dosing unit being degraded functionally, becoming overheated and sustaining permanent damage or even completely disintegrating. Even temperatures which are not critical for the hardware of the SCR system entail risk that the reductant might be adversely affected by the heat, which might result in crystallisation potentially leading to obstruction of, for example, the dosing unit.

There is thus a need to improve current SCR systems in order to reduce or eliminate the above disadvantages.

WO 2010003424 A1 describes a method and a system for dosing liquid in an exhaust line of a combustion engine.

SUMMARY OF THE INVENTION

An object of the present invention is to propose a novel and advantageous method for improving the performance of an SCR system.

An object of the present invention is to propose a novel and advantageous method for improving the performance of an SCR system when a dosing unit has insufficient or no cooling flow.

Another object of the present invention is to propose a novel and advantageous device of an SCR system and a novel and advantageous computer programme for improving the performance of an SCR system.

Another object of the present invention is to propose a novel and advantageous device of an SCR system and a novel and advantageous computer programme for improving the performance of an SCR system when a dosing unit has insufficient or no cooling flow.

An object of the present invention is to propose a method pertaining to an SCR system, which method results in reduced risk of undesirable functional degradation of components of the SCR system and/or reduced risk of obstruction of components, e.g. a dosing unit, of the SCR system with respect to a reducing agent.

A further object of the invention is to propose an alternative method pertaining to an SCR system and an alternative computer programme pertaining to an SCR system, and an alternative device of an SCR system.

These objects are achieved with a method pertaining to an SCR system for exhaust cleaning for an engine, as disclosed herein.

An aspect of the invention proposes a method pertaining to an SCR system for cleaning of exhaust gases from an engine, comprising a dosing unit situated in thermal contact with the engine's exhaust system and intended to supply a reducing agent to an exhaust duct of the exhaust system, comprising the step of determining whether there is an undesired temperature level of said dosing unit. The method comprises also the step, if there is found to be said undesired temperature level, of limiting the temperature of said exhaust duct by control of the operation of said engine.

In cases where cooling of the dosing unit is not sufficient, whereupon a temperature of the dosing unit rises to an undesired level, a temperature of exhaust gases in the exhaust system may be controlled by influencing the operation of the engine. With advantage, the result is a method which entails less risk of too high temperatures of the dosing unit. This prevents the dosing unit from sustaining permanent damage or the reducing agent from causing obstruction in the dosing unit as a result of crystallisation.

Said limitation of the temperature may be achieved by reducing a maximum available torque of an output shaft of the engine. To this end, neither a driver nor a stored operating routine may demand more torque than the maximum available. Reducing the maximum available torque will lower a temperature of the exhaust gases in the exhaust duct. Said reduction of the maximum available torque may be effected by ramping or in discrete stages. Said reduction of the maximum available torque may be based on a temperature of the exhaust gases in the exhaust duct which is either detected or is calculated by means of a stored model. Alternatively, said reduction of the maximum available torque may be based on a temperature of the dosing unit which is either measured or is calculated by means of a stored model.

Said limitation of the temperature may be achieved by influencing an EGR content of the engine. By influencing said EGR content it is possible for a temperature of the exhaust gases in the exhaust duct to be actively regulated to a desirable predetermined level. By altering said EGR content it is possible for a temperature of the exhaust gases in the exhaust duct to be actively lowered to a desirable predetermined level. Improved cooling of the dosing unit will thus be made possible.

Said limitation of the temperature may be achieved by influencing fuel injection times of at least one cylinder of the engine or by influencing ignition times of at least one cylinder of the engine. By altering injection times of at least one cylinder of a diesel engine, or an ignition time of at least one cylinder of an Otto engine, it is possible for a temperature of the exhaust gases in the exhaust duct to be actively regulated to a desirable predetermined level. By shifting injection times or an ignition time it is possible for a temperature of the exhaust gases in the exhaust duct to be actively lowered to a desirable predetermined level. Improved cooling of the dosing unit will thus be made possible.

Said undesired temperature level may be set on the basis of characteristics of said reducing agent. Said temperature level may in particular be set on the basis of a temperature at which said reducing agent begins to be adversely affected and/or become unstable. Said temperature level may be within a range of 80-130 degrees Celsius. Said temperature level may be a temperature which is higher than 130 degrees Celsius. According to an example with rather sensitive reducing agent said temperature level may be within a range of 60-90 degrees Celsius.

The step of determining whether there is an undesired temperature level of said dosing unit may be based on at least one of the following steps:
  measuring a temperature directly of the dosing unit;
  measuring a temperature of an exhaust flow in said exhaust duct; and
  calculating a temperature of said dosing unit by means of a calculation model.

Measuring a temperature directly of the dosing unit provides an exact measurement of the prevailing temperature there.

Measuring a temperature of the exhaust flow in the exhaust duct, or a temperature of a component of the exhaust system of the SCR system, e.g. the exhaust duct, may provide an indication of a prevailing temperature of the dosing unit. Measurement of the temperature of the exhaust flow in the exhaust duct is a good complement or alternative to directly measuring a temperature of the dosing unit.

Calculating a temperature of said dosing unit by means of a calculation model is a variant involving no need for physical sensors adjacent to the dosing unit and/or the exhaust duct (the exhaust system). It is therefore a cost-effective variant for determining a temperature of the dosing unit.

Determining (measuring or calculating) a temperature of the dosing unit, or determining (measuring or calculating) a temperature of some other component of the SCR system, which temperature corresponds to a temperature of the dosing unit, makes it possible to detect any occurrence of an undesired temperature level of a dosing unit adapted to supplying reducing agent to an exhaust duct in situations where cooling of the dosing unit is insufficient.

According to an example, a future temperature of the dosing unit may be predicted by means of a stored calculation model. According to an example, a prevailing load upon an engine of the SCR system may for example be catered for. It is well known that an exhaust temperature rise at an increase in engine load is related to a certain time lag. A future temperature of the dosing unit may therefore be predicted on the basis of a prevailing load, or change of load, upon the engine of the SCR system.

Said reducing agent may be a urea-based reducing agent, e.g. AdBlue.

The method may further comprise the step of manually discontinuing the step of controlling the operation of said engine in order to limit the temperature of said exhaust duct. During operating states in which there is insufficient cooling of the dosing unit, automatic control of the engine's operation is initiated in order to lower a temperature of the exhaust flow in a desirable way. If the SCR system is fitted in a rescue vehicle, e.g. a fire engine, a driver or some other member of the vehicle's crew may choose to actively discontinue said control of the engine's operation. This may result in the undesired consequence, for example, that the dosing unit is destroyed by too high temperatures and that the vehicle may thereupon release too large amounts of undesirable emissions. In the case of an urgent rescue, however, the innovative method may be overridden in order to prioritise high vehicle speed and high available engine torque. Deactivation of the innovative method may be by means of a push-button fitted in a driving cab of the vehicle and signal-connected to a control unit of the vehicle.

The method is easy to implement in existing motor vehicles. Software pertaining to an SCR system for exhaust cleaning for an engine according to the invention may be installed in a control unit of the vehicle during the manufacture of the vehicle. A purchaser of the vehicle may thus have the possibility of selecting the function of the method as an option. Alternatively, software which comprises programme code for applying the innovative method pertaining to an SCR system for exhaust cleaning for an engine may be installed in a control unit of the vehicle on the occasion of upgrading at a service station, in which case the software may be loaded into a memory in the control unit. Implementing the innovative method is therefore cost-effective, particularly since no further sensors or components need be installed in the vehicle. Relevant hardware is currently already provided in the vehicle. The invention therefore represents a cost-effective solution to the problems indicated above.

An aspect of the present invention proposes a device of an SCR system for cleaning of exhaust gases from an engine, comprising a dosing unit situated in thermal contact with the engine's exhaust system and intended to supply a reducing agent to an exhaust duct of the exhaust system, further comprising:
  means for determining whether there is an undesired temperature level of said dosing unit, and
  means, if there is found to be said undesired temperature level, for limiting the temperature of said exhaust duct by control of the operation of said engine.

The device may comprise means for reducing a maximum available torque of an output shaft of the engine in order to achieve said limitation of the temperature.

The device may comprise means for influencing an EGR content of the engine in order to effect said limitation of the temperature. Said limitation of the temperature may be achieved by influencing fuel injection times of at least one cylinder of the engine or by influencing ignition times of at least one cylinder of the engine.

The device may comprise at least one of the following:
means for measuring a temperature directly of the dosing unit;
means for measuring a temperature of an exhaust flow in said exhaust duct; and
means for calculating a temperature of said dosing unit by means of a calculation model.

The above objects are also achieved with a motor vehicle which comprises the device herein described of an SCR system. The vehicle may be a truck, bus or passenger car.

An aspect of the invention proposes a computer programme pertaining to an SCR system for exhaust cleaning for an engine, which programme contains programme code stored on a computer-readable medium for causing an electronic control unit or another computer connected to the electronic control unit to perform steps according to the disclosure herein.

An aspect of the invention proposes a computer programme pertaining to an SCR system for exhaust cleaning for an engine, which programme contains programme code for causing an electronic control unit or another computer connected to the electronic control unit to perform steps according to the disclosure herein.

An aspect of the invention proposes a computer programme product containing a programme code stored on a computer-readable medium for performing method steps according to the disclosure herein when said programme is run on an electronic control unit or another computer connected to the electronic control unit.

Software comprising programme code pertaining to an SCR system for exhaust cleaning for an engine is easy to update or replace. Moreover, different parts of the software containing programme code pertaining to an SCR system for exhaust cleaning for an engine may be replaced independently of one another. This modular configuration is advantageous from a maintenance perspective.

Further objects, advantages and novel features of the present invention will become apparent to one skilled in the art from the following details, and also by putting the invention into practice. Whereas the invention is described below, it should be noted that it is not restricted to the specific details described. Specialists having access to the teachings herein will recognise further applications, modifications and incorporations within other fields, which are within the scope of the invention.

BRIEF DESCRIPTION OF THE DRAWINGS

For fuller understanding of the present invention and further objects and advantages of it, the detailed description set out below should be read together with the accompanying drawings, in which the same reference notations denote similar items in the various diagrams, and in which.

DETAILED DESCRIPTION OF THE DRAWINGS

Figure 1:
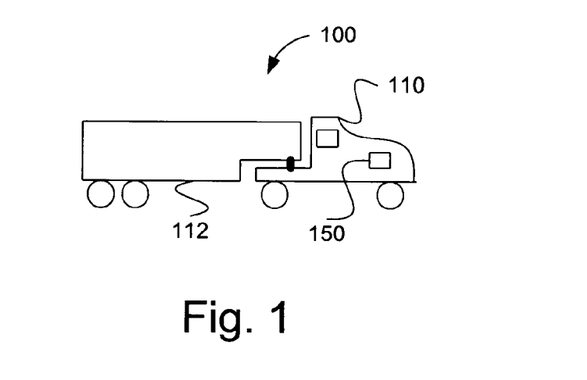
FIG. 1 illustrates schematically a vehicle according to an embodiment of the invention.

FIG. 1 depicts a side view of a vehicle 100. The exemplified vehicle 100 comprises a tractor unit 110 with an engine 150 and a trailer 112. The vehicle may be a heavy vehicle, e.g. a truck or a bus. The vehicle may alternatively be a passenger car.

It should be noted that the invention is applicable to any SCR system and is therefore not restricted to SCR systems of motor vehicles. The innovative method pertaining to an SCR system and the innovative device of an SCR system according to an aspect of the invention are well suited to other platforms which have an SCR system than motor vehicles, e.g. watercraft. The watercraft may be of any kind, e.g. motorboats, steamers, ferries or ships.

The innovative method pertaining to an SCR system and the innovative device of an SCR system according to an aspect of the invention also well suited to various kinds of power plants, e.g. an electric power plant comprising a diesel generator.

The innovative method pertaining to an SCR system and the innovative device of an SCR system are well suited to any engine system which comprises an engine and an SCR system, e.g. on a locomotive or some other platform.

The innovative method pertaining to an SCR system and the innovative device of an SCR system are well suited to any system which comprises a NO generator and an SCR system.

The term "link" refers herein to a communication link which may be a physical connection such as an optoelectronic communication line, or a non-physical connection such as a wireless connection, e.g. a radio link or microwave link.

The term "line" refers herein to a passage for holding and conveying a fluid, e.g. a reductant in liquid form. The line may be a pipe of any suitable size. The line may be made of any suitable material, e.g. plastic, rubber or metal.

The term "reductant" or "reducing agent" refers herein to an agent used for reacting with certain emissions in an SCR system. These emissions may for example be NOx gas. The terms "reductant" and "reducing agent" are herein used synonymously. Said reductant according to a version is so-called AdBlue. Other kinds of reductants may of course be used. AdBlue is herein cited as an example of a reductant, but specialists will appreciate that the innovative method and the innovative device are feasible with other types of reductants, subject to necessary adaptations, e.g. concerning temperature levels at which functional degradation of a given reductant is initiated, in control algorithms for executing software code in accordance with the innovative method.

Figure 2:
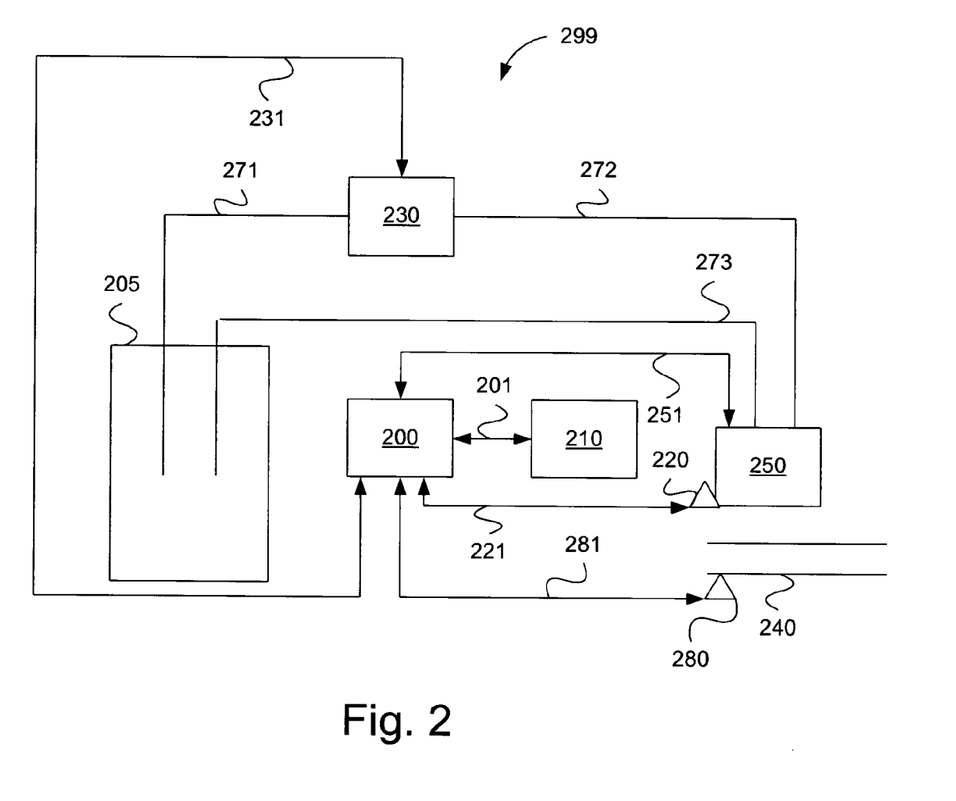
FIG. 2 illustrates schematically a subsystem for the vehicle depicted in FIG. 1, according to an embodiment of the invention.

FIG. 2 depicts a subsystem 299 of the vehicle 100. The subsystem 299 is situated in the tractor unit 110. The subsystem 299 may be part of an SCR system. The subsystem 299 comprises in this example a container 205 arranged to hold a reductant. The container 205 is adapted to containing a suitable amount of reductant and to being replenishable as necessary. The container might accommodate, for example, 75 or 50 liters of reductant.

A first line 271 is adapted to leading the reductant to a pump 230 from the container 205. The pump 230 may be any suitable pump. The pump 230 may be a diaphragm pump provided with at least one filter. The pump 230 is adapted to being driven by an electric motor. The pump 230 is adapted to drawing the reductant from the container 205 via the first line 271 and supplying it via a second line 272 to a dosing unit 250. The dosing unit 250 comprises an electrically controlled dosing valve by means of which an outflow of added reductant can be controlled. The pump 230 is adapted to pressurising the reductant in the second line 272. The dosing unit 250 is provided with a throttle unit against which said pressure of the reductant is built up in the subsystem 299.

The dosing unit 250 is adapted to supplying said reductant to an exhaust duct 240 of an exhaust system (not depicted) of the vehicle 100. The exhaust duct 240 is adapted to leading exhaust gases from the engine 150 to surroundings of the SCR system. More specifically, the dosing unit 250 is adapted to supplying a suitable amount of reductant in a controlled way to the exhaust duct 240 of the vehicle 100. According to this version, an SCR catalyst (not depicted) is situated downstream of a location in the exhaust system where the reductant supply is effected. The amount of reductant supplied in the exhaust system is intended to be used in a conventional way in the SCR catalyst to reduce the amount of undesirable emissions in a known way.

The dosing unit 250 is situated adjacent to the exhaust duct which is adapted to leading exhaust gases from the combustion engine 150 of the vehicle 100 to the SCR catalyst. The dosing unit 250 is situated in thermal contact with the exhaust system of the vehicle 100. This means that thermal energy stored in, for example, the exhaust duct 240, silencer and SCR catalyst can thus be led to the dosing unit 250.

The dosing unit 250 is provided with an electronic control card which is adapted to handling communication with a control unit 200. The dosing unit 250 comprises also plastic and/or rubber components which might melt or be otherwise adversely affected as a result of too high temperatures.

The dosing unit 250 is sensitive to temperatures above a certain value, e.g. 120 degrees Celsius. As for example the exhaust duct 240, the silencer and the SCR catalyst of the vehicle 100 exceed this temperature value, there is risk that the dosing unit might become overheated during or after operation of the vehicle if not provided with cooling.

It should be noted that reductant present in the dosing unit 250 might be adversely affected by temperatures significantly lower than the 120 degrees Celsius indicated above. At temperatures over, for example, 70 degrees Celsius the reducing agent may become unstable and might at somewhat higher temperatures crystallise and hence potentially cause obstruction of the dosing unit 250.

A third line 273 runs between the dosing unit 250 and the container 205. The third line 273 is adapted to leading back to the container 205 a certain amount of the reductant fed to the dosing valve 250. This configuration achieves with advantage cooling of the dosing unit 250. The dosing unit 250 is thus cooled by a flow of the reductant as it is pumped through the dosing unit 250 from the pump 230 to the container 205.

A first control unit 200 is arranged for communication with a first temperature sensor 220 via a link 221. The first temperature sensor 220 is adapted to detecting a prevailing temperature of the dosing unit 250. The first temperature sensor 220 is adapted to continuously sending signals to the first control unit 200 which contain information about a prevailing first temperature T1 of the dosing unit 250.

The first control unit 200 is arranged for communication with the pump 230 via a link 231. The first control unit 200 is adapted to controlling operation of the pump 230 in order for example to regulate the reductant flows within the subsystem 299. The first control unit 200 is adapted to controlling an operating power of the pump 230 by regulating the associated electric motor.

The first control unit 200 is arranged for communication with a second temperature sensor 280 via a link 281. The second temperature sensor 280 is adapted to detecting a prevailing temperature of the exhaust duct 240. The second temperature sensor 280 is adapted to continuously sending signals to the first control unit 200 which contain information about a prevailing temperature of the exhaust duct 240.

The first control unit 200 is adapted to calculating an estimated prevailing temperature of the dosing unit 250 on the basis of the signals received from the second temperature sensor 280.

The first control unit 200 is arranged for communication with the dosing unit 250 via a link 251. The first control unit 200 is adapted to controlling operation of the dosing unit 250 in order for example to regulate the reductant supply to the exhaust system of the vehicle 100. According to an example the first control unit 200 is adapted to controlling operation of the dosing unit 250 in order for example to regulate the reductant return supply to the container 205.

The first control unit 200 is adapted, according to a version, to using the signals received from the first temperature sensor 220 and/or the second temperature sensor 280 as a basis, where necessary, for limiting the temperature of said exhaust duct by control of the operation of said engine, in accordance with an aspect of the innovative method.

In particular, the first control unit 200 is adapted, according to a version, to using the signals received from the first temperature sensor 220 and the second temperature sensor 280 as a basis, where necessary, for reducing a maximum available torque of an output shaft of the engine and/or for influencing an EGR content of the engine.

The first control unit 200 is adapted, according to a version, to using the signals received from the first temperature sensor 220 and the second temperature sensor 280 as a basis, where necessary, for influencing fuel injection times of at least one cylinder of the engine or for influencing ignition times of at least one cylinder of the engine, in accordance with an aspect of the innovative method. This may also be done in combination with said reduction of the maximum available torque of an output shaft of the engine and/or said influencing of the engine's EGR content.

A second control unit 210 is arranged for communication with the first control unit 200 via a link 201. The second control unit 210 may be detachably connected to the first control unit 200. The second control unit 210 may be a control unit external to the vehicle 100. The second control unit 210 may be adapted to performing the innovative method steps according to the invention. The second control unit 210 may be used to cross-load software to the first control unit 200, particularly software for applying the innovative method. The second control unit 210 may alternatively be arranged for communication with the first control unit 200 via an internal network in the vehicle. The second control unit 210 may be adapted to performing substantially similar functions to those of the first control unit 200, e.g. determining whether there is an undesired temperature level of the dosing unit 250, which dosing unit 250 is adapted to supplying reducing agent to an exhaust duct, and if there is found to be said undesired temperature level, to limiting the temperature of said exhaust duct by control of the operation of said engine. The innovative method may be applied by the first control unit 200 or the second control unit 210 or by both the first control unit 200 and the second control unit 210.

Figure 3A:
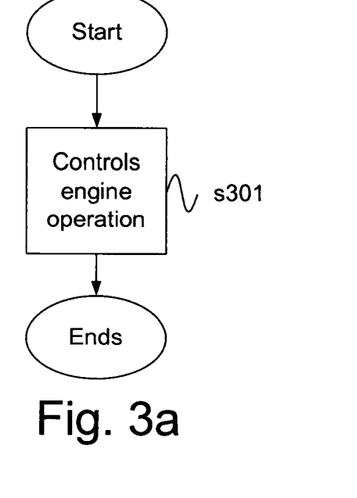
FIG. 3a is a schematic flowchart of a method according to an embodiment of the invention.

FIG. 3a is a schematic flowchart of a method pertaining to an SCR system for cleaning of exhaust gases from an engine 150, comprising a dosing unit 250 situated in thermal contact with the engine's exhaust system and intended to supply a reducing agent to an exhaust duct 240 of the exhaust system, according to an embodiment of the invention. The method comprises a first step s301. Method step s301 comprises the steps of determining s340 whether there is an undesired temperature level of said dosing unit 250 and, if there is found to be said undesired temperature level, of limiting s360 the temperature of said exhaust duct 240 by control of the operation of said engine. The method ends after step s301.

Figure 3B:
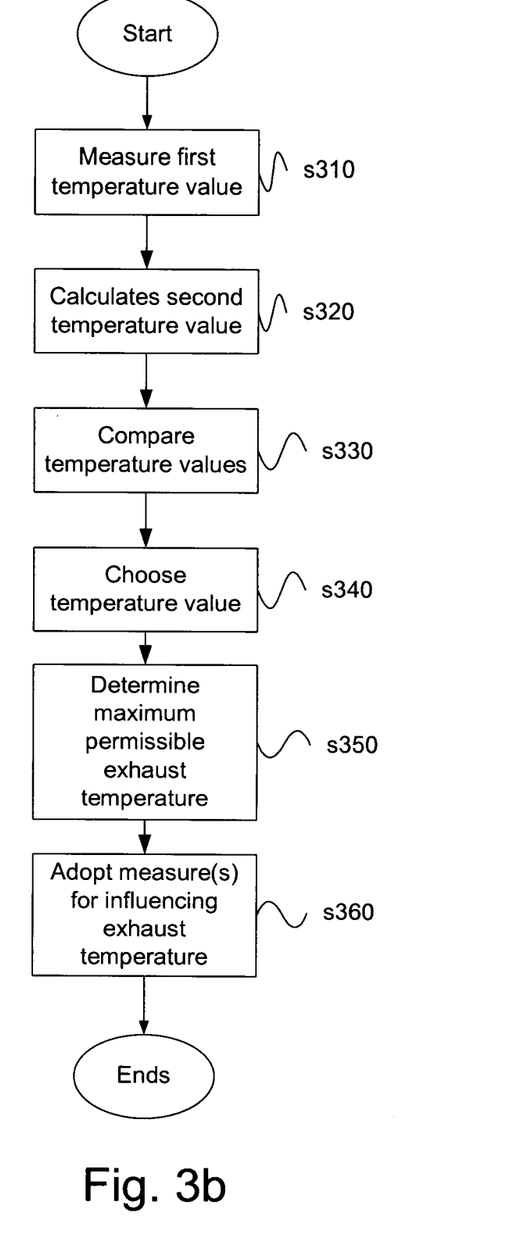
FIG. 3b is a more detailed schematic flowchart of a method according to an embodiment of the invention.

FIG. 3b is a schematic flowchart of a method pertaining to an SCR system for cleaning of exhaust gases from the engine 150, comprising a dosing unit 250 situated in thermal contact with the engine's exhaust system and intended to supply a reducing agent to the exhaust duct 240 of the exhaust system, according to an embodiment of the invention.

The method comprises a first step s310. Method step s310 comprises the step of determining a prevailing temperature of the dosing unit 250. This is done by direct measurement of prevailing temperatures adjacent to the dosing unit 250. Step s310 measures a first temperature value T1 which represents a prevailing temperature of the dosing unit 250. Step s310 is followed by a step s320.

Method step s320 comprises the step of determining indirectly an estimated prevailing temperature of the dosing unit 250. This is done by measurement adjacent to some other component of the SCR system than the dosing unit 250. Step s310 measures a second temperature value T2 of some other component than the dosing unit 250. The measured temperature T2 may be used to determine (calculate) a first estimated prevailing temperature T1est of the dosing unit 250. An alternative is that a second estimated prevailing temperature T2est of the dosing unit 250 may be determined (calculated) by means of a calculation model which has as input value some other parameter than temperature of a component of the SCR system. Such an input parameter may for example be a prevailing load upon the engine 150. It should also be noted that according to a version it is possible to use solely the measured temperature T1 of the dosing unit 250 for determining a highest temperature value Tmax as below. In certain cases it is advantageous to use both the measured temperature T1 and at least one of the estimated prevailing temperatures T1est and T2est for determining a highest temperature value Tmax as below, resulting in a more robust method. It should be noted that steps s310 and s320 may be performed substantially simultaneously, or in reverse order. Step s320 is followed by a step s330.

Method step s330 comprises the step of comparing the determined first temperature T1 and at least one of said estimated prevailing temperatures T1est and T2est of the dosing unit 250. Step s330 is followed by a step s340.

Method step s340 comprises the step of using a result of said comparison between the determined first temperature T1 and the at least one estimated prevailing temperature (T1est, T2est) of the dosing unit 250 as a basis for choosing the highest among the values compared. This highest temperature value is also called Tmax. Step s340 comprises also the step of determining whether there is an undesired temperature level of the dosing unit, in cases where said dosing unit is adapted to supplying reducing agent to an exhaust duct. This may be done by comparison with a limit value Tth such as a predetermined temperature value, e.g. 70 or 100 degrees Celsius, depending on which kind of reductant is used in the SCR system. If Tmax is higher than or equal to Tth, it may be found that there is an undesired temperature level of the dosing unit. If Tmax is lower than Tth, it may be found that there is no undesired temperature level of the dosing unit 250.

According to an alternative version, it is possible, as described above, to determine whether there is an undesired temperature level of the dosing unit 250 on the sole basis of the measured temperature T1 of the dosing unit, resulting in a less complex method, according to an aspect of the invention.

Step s340 is followed by a step s350.

Method step s350 comprises the step of using the chosen value Tmax as a basis for determining a maximum permissible exhaust temperature Tem. The maximum permissible exhaust temperature Tem may be determined by a reference data consultation process whereby the chosen value Tmax is related to a maximum permissible exhaust temperature Tem, e.g. in tabular form. The maximum permissible exhaust temperature Tem may alternatively be determined by means of a calculation model for which the chosen value Tmax is an input value. Step s350 is followed by a step s360.

Method step s360 comprises the step of using the determined maximum permissible exhaust temperature Tem as a basis for adopting at least one measure for influencing the temperature of the exhaust flow in the exhaust duct 240. According to a version, this at least one measure is chosen from among the following:

reducing a maximum available torque of an output shaft of the engine;
influencing an EGR content of the engine;
influencing fuel injection times of at least one cylinder of the engine, or influencing ignition times of at least one cylinder of the engine; and
influencing an air flow of the engine by means of one or more dampers, e.g. a throttle at the inlet and/or outlet side of the engine.

The method ends after step s360.

Figure 4:
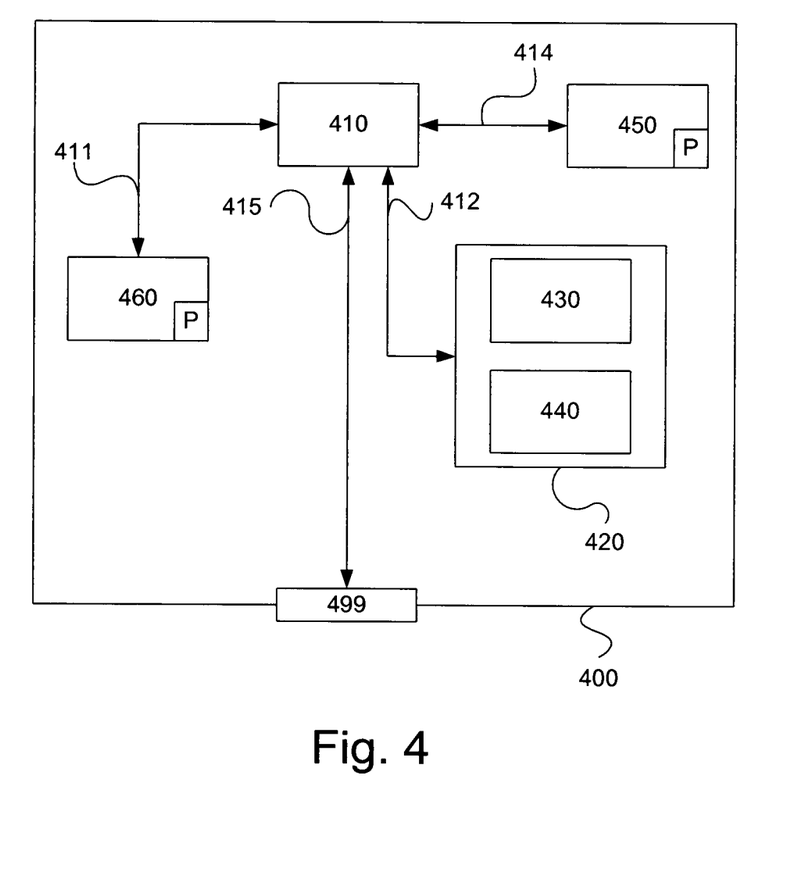
FIG. 4 illustrates schematically a computer according to an embodiment of the invention.

FIG. 4 is a diagram of a version of a device 400. The control units 200 and 210 described with reference to FIG. 2 may in a version comprise the device 400. The device 400 comprises a non-volatile memory 420, a data processing unit 410 and a read/write memory 450. The non-volatile memory 420 has a first memory element 430 in which a computer programme, e.g. an operating system, is stored for controlling the function of the device 400. The device 400 further comprises a bus controller, a serial communication port, I/O means, an A/D converter, a time and date input and transfer unit, an event counter and an interruption controller (not depicted). The non-volatile memory 420 has also a second memory element 440.

A proposed computer programme P comprises routines for determining whether there is an undesired temperature level of a dosing unit 250 which is situated in thermal contact with the engine's exhaust system and adapted to supplying reducing agent to an exhaust duct 240 of the exhaust system, and, if there is found to be said undesired temperature level, for limiting the temperature of said exhaust duct by control of the operation of said engine, in accordance with the innovative method.

The programme P comprises routines for, where appropriate, reducing a maximum available torque of an output shaft of the engine in order to achieve limitation of the temperature of the exhaust duct 240.

The programme P comprises routines for, where appropriate, influencing an EGR content of the engine 150 in order to achieve limitation of the temperature of the exhaust duct 240.

The programme P comprises routines for, where appropriate, influencing fuel injection times of at least one cylinder of the engine 150 or influencing ignition times of at least one cylinder of the engine 150, in order to achieve limitation of the temperature of the exhaust duct 240.

The programme P may be stored in an executable form or in a compressed form in a memory 460 and/or in a read/write memory 450.

Where the data processing unit 410 is described as performing a certain function, it means that the data processing unit 410 effects a certain part of the programme stored in the memory 460, or a certain part of the programme stored in the read/write memory 450.

The data processing device 410 can communicate with a data port 499 via a data bus 415. The non-volatile memory 420 is intended for communication with the data processing unit 410 via a data bus 412. The separate memory 460 is intended to communicate with the data processing unit 410 via a data bus 411. The read/write memory 450 is adapted to communicating with the data processing unit 410 via a data bus 414. The data port 499 may for example have the links 201, 221, 231, 251 and 281 connected to it (see FIG. 2).

When data are received on the data port 499, they are stored temporarily in the second memory element 440. When input data received have been temporarily stored, the data processing unit 410 is prepared to effect code execution as described above. According to a version, signals received on the data port 499 contain information about a prevailing temperature of the dosing unit 250. According to a version, signals received on the data port 499 contain information about a prevailing temperature of an exhaust flow in the exhaust duct 240. According to an alternative version, signals received on the data port 499 contain information about a prevailing temperature of a suitable component of the subsystem 299, e.g. a prevailing temperature of the exhaust duct, a prevailing temperature of the SCR catalyst or a prevailing temperature of a silencer of the SCR system. Such a signal may be used to calculate a prevailing temperature of the dosing unit 250 by means of a calculation model stored in the memory 460. The signals received on the data port 499 may be used by the device 400 to determine whether there is an undesired temperature of the exhaust flow in the exhaust duct 240 and, on the basis thereof, to influence operation of the engine 150 in such a way as to make it possible to achieve a desirable temperature of the exhaust flow.

Parts of the methods herein described may be effected by the device 400 by means of the data processing unit 410 which runs the programme stored in the memory 460 or the read/write memory 450. When the device 400 runs the programme, methods herein described are executed.

The foregoing description of the preferred embodiments of the present invention is provided for illustrative and descriptive purposes. It is not intended to be exhaustive or to restrict the invention to the variants described. Many modifications and variations will obviously be apparent to one skilled in the art. The embodiments have been chosen and described in order best to explain the principles of the invention and its practical applications and hence make it possible for specialists to understand the invention for various embodiments and with the various modifications appropriate to the intended use.

The invention claimed is:

1. A method pertaining to an SCR system for cleaning of exhaust gases from an engine, the engine generating an exhaust flow when operating, and ceasing generating the exhaust flow when operation halts;
    the SCR system comprising a reducing agent dosing valve situated in thermal contact with an exhaust system of the engine for supplying a reducing agent to an exhaust duct of the exhaust system;
    the method comprising the steps of:
    determining whether there is an undesired temperature level of said dosing valve by determining the dosing valve's temperature;
    setting a maximum permissible exhaust temperature based on the dosing valve's temperature; and
    if said undesired temperature level is found, lowering the temperature of said exhaust duct by controlling the operation of said engine based on the maximum permissible exhaust temperature.

2. A method according to claim 1, wherein said engine has an output shaft, and said limitation of the temperature is achieved by reducing a maximum available torque of the output shaft of the engine.

3. A method according to claim 1, wherein said limitation of the temperature is achieved by influencing an EGR content of the engine.

4. A method according to claim 1, wherein said limitation of the temperature is achieved by influencing fuel injection times of at least one cylinder of the engine or by influencing ignition times of at least one cylinder of the engine.

5. A method according to claim 1, wherein said undesired temperature level is set based on characteristics of said reducing agent.

6. A method according to claim 1, wherein determining whether there is an undesired temperature level of said dosing valve is based on at least one of:
    directly measuring a temperature of the dosing valve;
    measuring a temperature of an exhaust flow in said exhaust duct; and
    calculating a temperature of said dosing valve by a calculation model.

7. A method according to claim 1, wherein said reducing agent is a urea-based reducing agent.

8. A computer programme product pertaining to an SCR system for exhaust cleaning of an engine, wherein said programme product comprises non-transitory programme code with non-transitory programme instructions for causing a computer system to perform steps according to claim 1 on an electronic control unit or causing another computer connected to the electronic control unit to perform such steps when instructions in said code are run on said computer,
    wherein said product contains a programme code stored on a non-transitory computer-readable medium which can be read by said computer system for performing method steps when said computer programme is run on an electronic control unit or another computer connected to said electronic control unit.

9. A device of an SCR system for cleaning of exhaust gases from an engine, the engine generating an exhaust flow when operating, and ceasing generating the exhaust flow when operation halts;
    the SCR system comprising a reducing agent dosing valve situated in thermal contact with an engine exhaust system of the engine, the dosing valve being configured for supplying a reducing agent to an exhaust duct of the exhaust system;

a control device comprising a data processing unit and a non-volatile memory, the control device being configured to determine, based on the dosing valve's temperature, whether said dosing valve has reached an undesirable temperature, configured to set a maximum permissible exhaust temperature based on the dosing valve's temperature; and configured and operable to lower the temperature of said exhaust duct by control of the operation of said engine based on the maximum permissible exhaust temperature.

10. A device according to claim 9, further comprising said engine having an output shaft; and the control device is configured to reduce a maximum available torque of an output shaft of the engine to achieve said limitation of the temperature.

11. A device according to claim 9, wherein the control device is configured to influence an EGR content of the engine to achieve said limitation of the temperature.

12. A device according to claim 9, wherein said limitation of the temperature is achieved by influencing fuel injection times of at least one cylinder of the engine or by influencing ignition times of at least one cylinder of the engine.

13. A device according to claim 9, configured for setting said undesired temperature level based on characteristics of said reducing agent.

14. A device according to claim 9, further comprising at least one of:

a temperature sensor located and configured to directly measure a temperature of the dosing valve; and a further temperature sensor for measuring a temperature of an exhaust flow in said exhaust duct.

15. A device according to claim 9, wherein said reducing agent is a urea-based reducing agent.

16. A motor vehicle comprising a device according to claim 9.

17. A motor vehicle according to claim 16, comprising a truck, bus or passenger car.

18. A device according to claim 9, wherein the control device is configured to calculate a temperature of said dosing valve using a calculation model.

* * * * *